Patented Feb. 23, 1937

2,072,069

UNITED STATES PATENT OFFICE 2,072,069

COMPOSITION OF MATTER FOR COATING INDUSTRY

Carleton Ellis, Montclair, N. J., assignor to Ellis-Foster Company, a corporation of New Jersey No Drawing. Application March 11, 1935, Serial No. 10,477

8 Claims. (Cl. 134—17)

This invention relates to coating compositions comprising chlorinated rubber associated with plasticizing agents designed to increase flexibility and adhesion of chlorinated rubber without sacrificing its resistance to those weathering and chemical influences which may be encountered when the coating is exposed to conditions adverse to other coatings.

As a rule, films of chlorinated rubber, particularly of those grades whose viscosity in solution is such that they are useful in brushing and spraying coatings, are quite brittle when thoroughly dry and have poor adhesion, although they have excellent chemical resistance. They require the presence of plasticizing agents. It is an object of this invention to provide plasticizers that increase the elasticity and adhesion of chlorinated rubber films when applied to metal or wood and that do not detract from the normal resistivity of this material toward corrosion from fumes, gas, dust, water and like agents of film destruction.

Mixed xylenols form a resin with formaldehyde that is oil soluble. This resin lends itself to oil-varnish formulation and affords a varnish that has extremely high durability on exterior exposure. Xylenol resin itself is too brittle for use with chlorinated rubber to increase plasticity and is not compatible with chlorinated rubber. Although clear solutions of a mixture of this resin with the rubber derivative in suitable solvents can be obtained, they do not give clear films when dry unless an undue amount of a blending plasticizer such as tricresyl phosphate or dibutyl phthalate is added. In this case clear films are obtained but the amount of blending material is such that the films are soft and tacky. On the other hand, substances such as linseed, tung and castor oils, which are normally compatible with chlorinated rubber, fail to give a clear film when added to a solution of chlorinated rubber and xylenol resin in any proportion. However, the varnish base, formed by heating tung oil and xylenol-formaldehyde until the resin has dissolved and the oil is suitably bodied, is miscible with chlorinated rubber within limits depending not only upon the proportion of chlorinated rubber to varnish base but also upon the proportion of tung oil to xylenol resin in the varnish base. One aspect of this invention consists, therefore, in the utilization of the heat-treated mixture of xylenol resin and tung oil or other drying oil as a plasticizing agent for chlorinated rubber.

Other oil-soluble resins constituted solely of a phenol and an aldehyde (or a mixture of aldehydes, or a mixture of an aldehyde and a ketone, e. g., formaldehyde and acetone) can be used in place of xylenol-formaldehyde. For example, the resin can be formed from formaldehyde and homologues of phenol higher than the xylenols. Also resins from synthetic alkylated or arylated phenols are applicable; however, resins from the latter kinds of phenols are expensive in comparison with xylenol-formaldehyde.

A xylenol resin suitable for use in combination with drying oils for modifying the film properties of chlorinated rubber can be made in the following manner. It is to be understood that variations in the proportions of reactants and in the reaction conditions are allowable without departing from the general proposition of obtaining an oil-soluble resin. 10 pounds of a mixture of xylenols boiling, for example, between 210° and 225° C. are mixed and heated under a reflux condenser for about 2 hours or until a distinct water layer forms at the top of the reaction mixture. The water is decanted and the viscous liquid is subjected to steam distillation to remove uncombined xylenols. The final product is a light brown, brittle resin.

Varnish bases are made from this resin by heating with a drying oil in the usual way employed in making oil varnishes. That is, the resin and oil are heated at a high temperature (240–280° C.) until the resin has dissolved and the solution has reached the desired viscosity. The ratio of oil to resin is varied according to the elasticity desired in the final varnish film. However, as mentioned above, varying the ratio of drying oil to xylenol resin also varies the miscibility of the varnish base with chlorinated rubber. For example, a varnish base containing 3 parts or more of tung oil to 1 part of xylenol resin is miscible with chlorinated rubber in all proportions when a suitable solvent is used. However, for tung oil varnish bases of shorter oil-length there is a range of proportions of varnish base and chlorinated rubber wherein the two are but partially miscible. Thus, a base comprised of 2 parts tung oil to 1 part resin is miscible with chlorinated rubber only when used in proportions of 2 parts or more of varnish base to 1 part of chlorinated rubber and 1 part or less of base to 2 parts of chlorinated rubber. Likewise, the limits of miscibility with chlorinated rubber of a varnish base comprised of equal parts of xylenol resin and tung oil are defined by the proportions of 1 part or less of varnish base to 5 parts of chlorinated rubber and 5 parts or more of base to 1 part of chlorinated rubber. Varnish bases of less oil-length than 3 parts of oil to 1 part resin are, of course, used with chlorinated rubber for the purposes of this invention in such proportion that complete miscility occurs. With other drying oils, of course, the limits of miscibility are different. Thus an oil base composed of 2 parts of linseed oil and 1 part of xylenol resin is miscible with chlorinated rubber in all proportions.

Besides being dependent upon the oil-length of the varnish base, compatibility of chlorinated rubber with the compositions is also greatly influenced by the solvent mixture employed. Complete miscibility of the xylenol resin-drying oil base with chlorinated rubber is very difficult with solvents such as coal-tar hydrocarbons, although these are excellent solvents for either the rubber derivative or the varnish base alone. It has been found that gycol ethers used in relatively small proportion with coal-tar hydrocarbons yield clear solutions of the mixture of chlorinated rubber and varnish base, and these solutions dry to clear, smooth films. Also, mineral spirits can be added to such solvent mixtures in considerable amount before clouding of the solution occurs. Preferred solvents for these plasticized chlorinated rubber compositions therefore consist of a mixture of a relatively small amount (10 to 25 per cent) of a glycol ether with coal-tar hydrocarbons, particularly the higher-boiling fractions of the latter (solvent naphtha or high-flash naphtha) where the coating is to be applied by brushing. For spraying, toluol can be used. Another satisfactory solvent is a mixture of glycol mono-ethyl ether and dioxan.

A preferred method of incorporating chlorinated rubber with the varnish base is to prepare a solution of each in the desired solvents and then to mix the two solutions. However, if desired, the chlorinated rubber in dry form can be mixed directly into a solution of the varnish base. Driers can be added, the introduction of which can be made by cooking lead, cobalt or manganese oxides or salts into the varnish base at the time the resin is dissolved in the oil. Or, soluble driers can be used, these being added either to the varnish base solution or to the final composition.

The following examples are given in order to further explain the invention. Proportions are parts by weight.

*Example 1.*—A mixture of 3 parts of tung oil and 1 part of xylenol-formaldehyde resin was heated to 280° C. and held at this temperature until the mixture showed signs of stringing. The solution was allowed to cool to about 150° C. and was thinned with 4 parts of xylene (Varnish A).

A 25% solution of chlorinated rubber in xylene was prepared.

These two solutions were mixed in the proportions of 15 parts of varnish A and 70 parts of chlorinated rubber solution. When 10 parts of glycol monoethyl ether were stirred in a thorough blend of the constituents resulted. The clear solution was of brushing consistency and dried to a hard smooth film.

*Example 2.*—40 parts of varnish A, 35 parts of a 25% solution of chlorinated rubber in xylene, and 10 parts glycol ethyl ether when mixed gave a stable blend. To the clear solution there was added 1 part of a drier solution consisting of a 40% solution of lead-cobalt naphthenate in mineral spirits. The varnish dried rapidly when brushed on a surface. One method of applying the finish is to brush on a priming coat, allow this to dry to a dust-free stage and then apply a second coat. Each coat is allowed to become only partially dry before the next is applied.

*Example 3.*—A varnish base was prepared by heating 2 parts of tung oil and 1 part of xylenol-formaldehyde resin at 280° C. for about 10 minutes. This was thinned with an equal amount by weight of solvent naphtha. (Varnish B.)

8 parts of this varnish and 64 parts of a 25% solution of chlorinated rubber in xylene were mixed. The cloudy mixture became clear when about 15 parts of glycol monomethyl ether were added. The resulting composition dried to give a clear hard film.

*Example 4.*—50 parts varnish B, 25 parts of a 25% solution of chlorinated rubber in xylene, and 15 parts of glycol monomethyl ether were mixed. 1 part of a 40% solution of lead-cobalt naphthenate in mineral spirits was added. This produced a fast-drying varnish of good brushing consistency.

*Example 5.*—A varnish base was formed by heating equal parts of tung oil and xylenol resin at 280° C. for 20 minutes. This was thinned with xylene to give a 50% solution. (Varnish C.)

2 parts of this varnish were added to 36 parts of a 25% solution of chlorinated rubber in xylene. The mixture was clear after 20 parts of glycol monomethyl ether were added.

*Example 6.*—35 parts of varnish C and 7.7 parts of a 25% solution of chlorinated rubber in xylene were mixed. Addition of 20 parts of glycol monoethyl ether and 2 parts of a 40% solution of lead-cobalt naphthenate in mineral spirits gave a clear varnish that dried rapidly to a hard smooth film.

In the above examples there is used a 25% solution of chlorinated rubber in xylene. Solutions of greater or less concentration are, of course, applicable, for example, a 50% solution of chlorinated rubber (particularly if the chlorinated rubber is of the low-viscosity type). The kind of coal-tar solvent used depends upon the rate of evaporation desired; that is, for brushing a slow-drying solvent such as solvent naphtha is preferable. Such solvents also give coatings of higher gloss.

*Example 7.*—A mixture of 4 parts tung oil and 1 part xylenol resin was heated at 260° C. for 10 minutes and thinned with solvent naphtha to form a 50% solution. (Varnish D.)

2 parts of this varnish were mixed with 3 parts of a 33% solution of chlorinated rubber in solvent naphtha. A cloudy solution resulted which became clear when 5% glycol monoethyl ether was added. 1% lead and cobalt naphthenate drier was added to the solution. This varnish contains an equal amount of varnish base (oil and resin) and chlorinated rubber and forms a tough adherent film which dries further by air-oxidation of the drying oil constituent to a hard, resistant coating. Coatings from the latter varnish are remarkably adherent, especially to metals. Although pigments cut down the adhesive properties, enamels made from this varnish were still notably adherent.

*Example 8.*—A varnish base was made by heating together 2 parts of xylenol resin with 1 part raw linseed oil to 290° C., then slowly adding 1½ parts of raw linseed oil, continuing the heating over a period of about ¾ hour. The composition was thinned with xylene to form a 50% solution. (Varnish E.)

4 parts of this varnish were added to 4 parts of a 25% solution of chlorinated rubber in xylene. A clear solution was formed to which 5% ethylene glycol monoethyl ether was added as thinner.

This varnish dried rapidly to a firm film. When driers were incorporated the film became tough and resistant.

*Example 9.*—4 parts of a 25% solution of chlorinated rubber in xylene were added to 2 parts of varnish E. A clear solution resulted which was thinned with 10% glycol ethyl ether. A film of this varnish rapidly dried clear and tough.

Example 10.—8 parts of a 25% solution of chlorinated rubber in xylene were stirred with 2 parts of varnish E. The clear solution which was formed was thinned with 10% glycol monoethyl ether. A film of this varnish dried clear and tough in a short time.

In Examples 8, 9 and 10 the addition of the glycol ether may be dispensed with. By omitting this solvent good films result and if the varnish is pigmented identical coatings are obtained with or without the glycol ether. However, if clear varnishes are desired, smoother films are obtained by using the glycol ethers. In the compositions described in Examples 1 through 7 inclusive, the glycol ethers are preferred as blending agents to secure good films.

In general, linseed oil-xylenol resin bases are more compatible with chlorinated rubber than those containing tung oil.

Example 11.—A 1 to 1 oil-resin base was made by heating together 1 part of xylenol resin and ½ part of linseed oil to 280° C., then slowly adding ½ part of linseed oil over a period of 30 minutes, maintaining the temperature at 280° C. When cooled to room temperature the base was thinned with xylene to give a 50% solution. (Varnish F.)

8 parts of a 25% solution of chlorinated rubber in xylene were added to 2 parts of this varnish. A clear solution was formed. A film of this lacquer dried clear, hard and tough in a short time. The addition of 10% of glycol monoethyl ether gave a smoother film.

Example 12.—4 parts of a 25% solution of chlorinated rubber in xylene were added to 2 parts of varnish F. A clear solution resulted which gave a clear, firm film on drying.

Example 13.—4 parts of a 25% solution of chlorinated rubber in xylene were blended with 4 parts of varnish F. The resulting clear solution gave a firm, clear film. When lead and cobalt driers were added to the varnish, the resulting film dried to a tough, clear coating.

The addition of glycol ethers to the last two varnish compositions yielded smoother films.

In some lacquer compositions plasticizers which do not become hard by air oxidation are desired.

Example 14.—2 parts of castor oil and 1 part of xylenol resin were heated together to 280° C. for 20 minutes. When cooled to about 80° C. it was thinned with xylene to form a 50% solution.

1 part of this plasticizing solution was mixed with 8 parts of a 25% solution of chlorinated rubber in xylene. 20% glycol monoethyl ether was added to form a clear homogeneous solution drying to a clear, tough film.

Pigmented coating compositions may be made by mixing a pigment with any of the compositions described in the above examples. Coatings are obtained which are resistant and smooth.

Example 15.—A varnish base was made by heating together 1 part of xylenol resin and 4 parts of tung oil to 260° C. and held at this temperature for about 7 minutes. (Base I.)

A varnish base was made by heating 1 part raw linseed oil and 2 parts of xylenol resin to 260° C. until a clear melt was obtained and a sample drop remained clear on cooling to room temperature. While keeping the temperature at 260° C., 1 part additional of linseed oil was slowly added. The total heating time was ¾ hour. (Base II.)

2⅔ pounds of chlorinated rubber were dissolved in 5⅓ pounds of xylene. (Chlorinated rubber base.) 4 pounds of this solution were then ground with 2 pounds of zinc oxide and ⅙ pound of titanium dioxide in a paint mill until a smooth paste resulted. (Paste.)

The following compositions were then made up:

Composition I

| | Pounds |
|---|---|
| Paste | 1½ |
| Base I | ½ |
| Chlorinated rubber base | 1 |

When thoroughly mixed to a homogeneous thick paint, it was diluted with xylene and glycol monoethyl ether to a brushing consistency.

Composition II

| | Pounds |
|---|---|
| Paste | 1½ |
| Base II | ½ |
| Chlorinated rubber base | 1 |

Stirred to homogeneity and diluted to brushing consistency with xylene and glycol monoethyl ether.

The coatings of both compositions were of medium gloss, had good covering power and brushed easily.

One type of synthetic drying oil which dries by air oxidation, as do the natural drying oils, is made by polymerizing a mixture of mono- and diolefins. These drying compounds are generally obtained as by-products in the refining of highly cracked petroleum distillates and are compatible with chlorinated rubber alone or in admixture with natural or synthetic resins such as ester gum, xylenol resin or amberol resins. Another synthetic drying oil is obtained by dechlorination of highly chlorinated heavy hydrocarbons.

Example 16.—2 parts of a synthetic drying oil, obtained from highly cracked petroleum distillate, was mixed with 16 parts of a 25% solution of chlorinated rubber in toluol, giving a clear solution. A film from this solution dried hard, tough and clear, but slightly streaked. The addition of 5 parts of glycol monoethyl ether to the solution gave a film which on drying was clear and smooth.

In general varnishes comprising chlorinated rubber and a synthetic drying oil, when thoroughly dried both by evaporation of solvent and air oxidation, yield films which are too brittle, necessitating the addition of a plasticizer. The plasticizer may consist of some high-boiling solvent such as tricresyl phosphate or dibutyl phthalate, or it may be a fatty oil such as castor oil, or one of the compositions mentioned in examples 1 through 13, inclusive.

Example 17.—

| | Parts |
|---|---|
| Drying oil obtained from highly cracked petroleum distillates | 1 |
| Tricresyl phosphate | 1 |
| Chlorinated rubber | 2 |
| Xylene | 10 |
| Glycol monoethyl ether | 2 |
| Lead-cobalt naphthenate solution | ¼ |

The chlorinated rubber was dissolved in the xylene and glycol ether, then the other constituents were mixed in, giving a clear, homogeneous solution of a suitable brushing viscosity. A film from this varnish dried clear, hard and tough.

Besides the synthetic drying oils mentioned above, oil-soluble resins of varying degrees of hardness are also formed by the catalytic polymerization of mixtures containing diolefins and particularly when aromatic hydrocarbons are present. These resins are soluble in a wide range of solvents and are compatible with chlorinated rubber either alone or in admixture with natural or synthetic drying oils or non-drying fatty oils.

*Example 18.*—2 parts of a brittle resin, formed by polymerizing a mixture of olefins obtained from cracked petroleum with anhydrous aluminum chloride (as described in U. S. Patent 1,836,629, December 15, 1931), were dissolved in a solvent consisting of 3 parts toluol and 2 parts glycol monoethyl ether. This solution was mixed with a 25% solution of chlorinated rubber in toluol, yielding a homogeneous, clear varnish which dried to a clear, smooth, brittle coating.

Coatings from this varnish are too brittle and plasticizers must be added, such as castor oil, linseed oil, tricresyl phosphate and hydrogenated ethyl abietate.

Varnish compositions of extremely high resistivity may be prepared by using the non-saponifiable constituents mentioned above. For instance, a varnish composed of chlorinated rubber, a synthetic drying oil from highly cracked petroleum, a synthetic resin from anhydrous aluminum chloride-polymerized olefins and a plasticizer such as epiphenylin together with a suitable solvent gives, with or without added pigments, a coating highly resistant to the chemical action of acids, alkalies, fumes, sea water and gas, which are highly destructive to protective coatings.

Compositions comprising a drying oil, chlorinated rubber and xylenol resin with or without a plasticizer and pigment stand up for long periods where other coatings are corroded in a short time. Furthermore, the addition of a xylenol resin-fatty oil base to chlorinated rubber varnishes improves their adhesion to metal and glazed surfaces and plasticizes them without the need of additional plasticizers which tend to soften and make the varnish film more easily affected under conditions amendable to film destruction.

Among the fatty oils which may be used with xylenol resins to form plasticizers and adhesion promoters are linseed oil, tung oil, oiticica, oil, soya bean oil, perilla oil, castor oil, and the like.

What I claim is:

1. A coating composition comprising chlorinated rubber and a heat-treated mixture of a fatty oil and a xylenol-aldehyde resin soluble in said oil.

2. A coating composition comprising chlorinated rubber and a heat-treated mixture of a drying oil and a xylenol-aldehyde resin soluble in said oil.

3. A coating composition comprising chlorinated rubber and a heat-treated mixture of a xylenol-formaldehyde resin and tung oil.

4. A coating composition comprising chlorinated rubber and a heat-treated mixture of an oil-soluble xylenol resin and linseed oil.

5. A coating composition comprising chlorinated rubber and a heat-treated mixture of an unmodified, oil-soluble, phenol-aldehyde resin and a fatty oil.

6. A coating composition comprising chlorinated rubber and a plasticizer comprising a heat-treated mixture of a xylenol resin and castor oil.

7. In the product of claim 1, a solvent comprising a major proportion of chlorinated rubber solvent and a minor proportion of a glycol ether.

8. In the product of claim 2, a solvent consisting of 70 per cent or more of a coal tar hydrocarbon and 30 per cent or less of a glycol ether.

CARLETON ELLIS.